United States Patent
Donndelinger et al.

(10) Patent No.: US 9,317,596 B2
(45) Date of Patent: Apr. 19, 2016

(54) FUNCTION-BASED METHOD FOR CLASSIFYING AND FUSING SYSTEM BEHAVIOR INFORMATION IN PRODUCT DEVELOPMENT

(71) Applicant: GM GLOBAL TECHNOLOGY OPERATIONS LLC, Detroit, MI (US)

(72) Inventors: Joseph A. Donndelinger, Dearborn, MI (US); John A. Cafeo, Farmington, MI (US); Soumen De, Bangalore (IN); Dnyanesh Rajpathak, Bangalore (IN); Prakash M. Peranandam, Bangalore (IN); Kay L. Darden, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/551,723

(22) Filed: Nov. 24, 2014

(65) Prior Publication Data

US 2015/0286712 A1 Oct. 8, 2015

Related U.S. Application Data

(63) Continuation-in-part of application No. 14/243,972, filed on Apr. 3, 2014.

(51) Int. Cl.
*G06F 17/30* (2006.01)
(52) U.S. Cl.
CPC .... *G06F 17/30734* (2013.01); *G06F 17/30336* (2013.01); *G06F 17/30604* (2013.01); *G06F 2201/80* (2013.01)
(58) Field of Classification Search
CPC ............... G06F 17/30734; G06F 17/30336; G06F 17/30604; G06F 2201/80
USPC ................ 707/602, 603, 608, 702, 726–751; 704/9, 4, 239, 245
See application file for complete search history.

(56) References Cited

U.S. PATENT DOCUMENTS

| | | | | |
|---|---|---|---|---|
| 2009/0197225 | A1* | 8/2009 | Sheehan | G09B 17/003 434/169 |
| 2012/0233132 | A1* | 9/2012 | Rajpathak | G06F 17/30734 707/687 |
| 2014/0163966 | A1* | 6/2014 | Dwarakanath | G06F 17/2765 704/9 |

OTHER PUBLICATIONS

Michael E. Stock, et al., Going Back in Time to Improve Design: The Elemental Function-Failure Design Method, Proceedings of DETC2003/DTM-48633, ASME 2003 Design Engineering Technical Conference, Computers and Information in Engineering Conference, Chicago, Illinois USA, Sep. 2-6, 2003.

*Primary Examiner* — Marcellus Augustin

(57) ABSTRACT

A method of automatically developing an ontology for product function and failure mode documentation for an apparatus. The apparatus is identified. A function-flow model is generated for the identified apparatus for identifying a composite structure of the apparatus. Functions and failure modes associated with the identified apparatus are enumerated. Failure data is obtained from a plurality of heterogeneous data sources. A semantic similarity module is applied to the enumerated failures by comparing a plurality of documents between the data sources. The semantic similarity module bridges a variety of terms used in the heterogeneous data to describe a respective failure. Failures associated with the enumerated apparatus functions are extracted from the plurality of documents between heterogeneous data sources. A composite of related terminology is generated for each identified failure mode. A failure mode information document is generated utilizing the composite of related terminology for each identified failure mode.

24 Claims, 8 Drawing Sheets

FUNCTION-BASED METHOD FOR CLASSIFYING AND FUSING SYSTEM BEHAVIOR INFORMATION IN PRODUCT DEVELOPMENT

CROSS-REFERENCE TO RELATED APPLICATIONS

The application is a continuation-in-part of U.S. application Ser. No. 14/243,972, filed Apr. 3, 2014.

BACKGROUND OF INVENTION

An embodiment relates generally to autonomously developing ontologies of product function and failure documentation.

In system development process, design requirements such as design failure mode effects analysis (DFMEA) and elemental function-failure design method (EFDM) utilize functional similarity to design products and with a knowledge base of the failures that can occur with design characteristics. However, automation of integrating field data and identification of new failure modes rely on pre-existing data structures and "humans" in the loop during execution of the documents. Typically, a pre-defined ontology and/or legacy documents are required to provide classification structures. In addition, user intervention is required to process newly identified failure modes. As a result, synthesis of heterogeneous data in documents such as DFMEA research is a challenging and time-intensive task since iterative human work is required to process data beyond a scope of the prior work products. As a result, no techniques are currently available to compare document semantic similarity between heterogeneous data. Under current techniques, without failure data and prior knowledge, most estimations for completing rankings in the documents would require subject guessing on the part of the human.

SUMMARY OF INVENTION

An advantage of an embodiment is the autonomous identification of hidden links among plurality of requirement documents in addition to the identification of the degree of the linking relationship between each of the requirements. The technique operates with stand and non-standard language processing and semantic similarity techniques for fusing failures from a variety of heterogeneous data sources to an associated function. A functional-flow model is first identified which provides a composite structure of the identified apparatus, which provides metes and bounds for enumerating all apparatus functions within the model. The advantage over conventional techniques, where standard and non-standard language processing is involved and such conventional techniques would not identify a linking relationship between the respective failures, the embodiments described herein determine a linking relationship and bin the respective failures to an associated category so that failure mode documents may be more readily generated.

An embodiment contemplates a method of automatically developing an ontology for product function and failure mode documentation for an apparatus. The apparatus is identified. A function-flow model is generated for the identified apparatus for identifying a composite structure of the apparatus. Functions associated with the identified apparatus are enumerated. Failure modes for the enumerated apparatus functions are enumerated. Failure data from a plurality of heterogeneous data sources is obtained. A semantic similarity module is applied to the enumerated failures by comparing a plurality of documents between heterogeneous data sources, the semantic similarity module bridging a variety of terms used in the heterogeneous data to describe a respective failure. Failures associated with the enumerated apparatus functions are extracted from the plurality of documents between heterogeneous data sources. A composite of related terminology for each identified failure mode is generated. A failure mode information document is generated utilizing the composite of related terminology for each identified failure mode.

DETAILED DESCRIPTION

Figure 1:
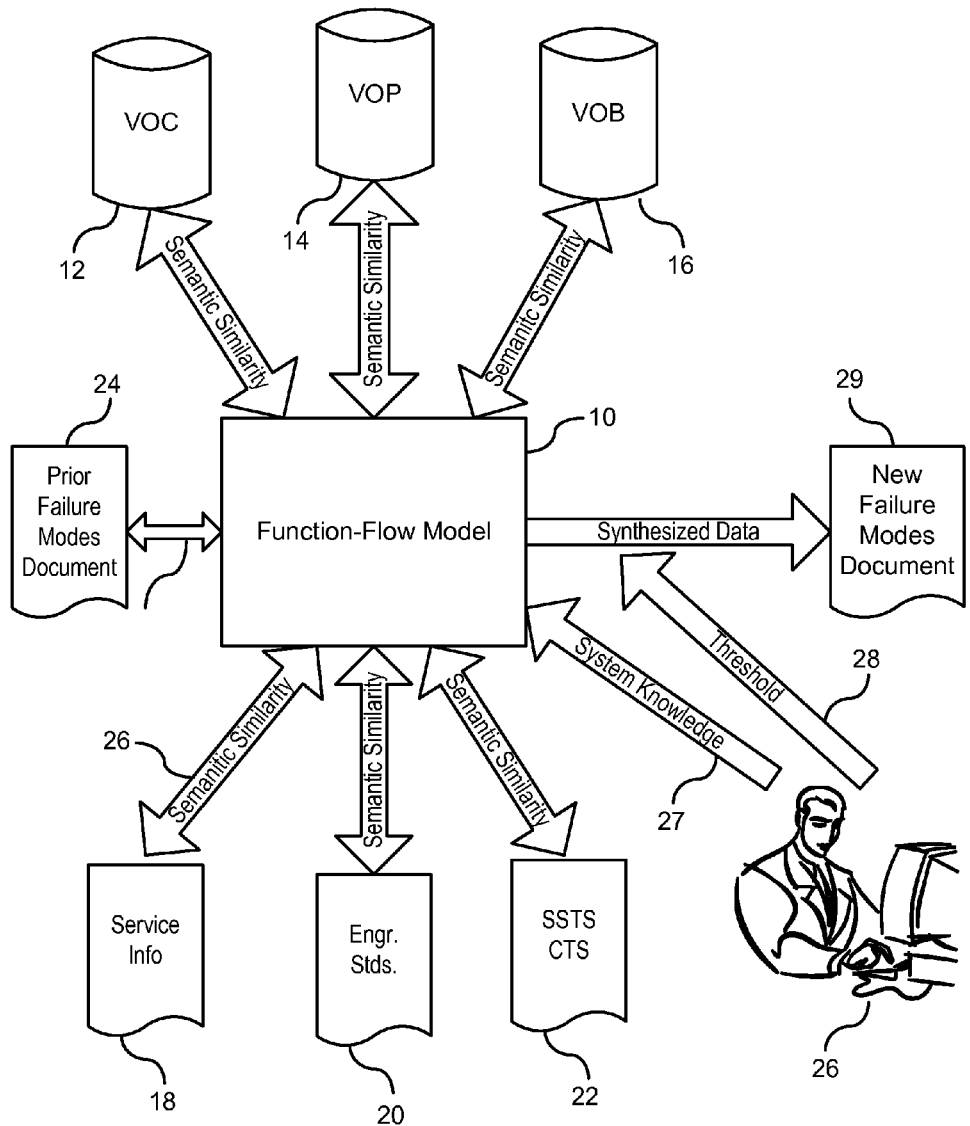
FIG. 1 a block diagram of an autonomous ontology development system.

There is shown in FIG. 1, a block diagram of an autonomous ontology development system for generating product function and failure mode documentation. A functional-flow model is shown generally at 10. The functional flow model 10 identifies all functionalities directly and indirectly relating to the apparatus. The apparatus as described herein can represent the following which includes, but is not limited to, a system, subsystem, component, part, and can be electrical or mechanical. In addition, although the examples described herein relate to apparatus' in a vehicle, it is understood that the apparatus may pertain to non-vehicle systems including, but not limited to, manufacturing or assembly facilities, robotics, and aerospace. The functionality of the apparatus includes direct functions that the apparatus actively performs, or indirect functions that the apparatus may perform whether performed dynamically or statically.

The function-flow model 10 is a comprehensive scope of the functionality of the apparatus, thereby providing metes and bounds for enumerating all apparatus functions within the model. For illustration purposes, a function-flow model 10 may be illustrated as a diagram, such as a mind map, used to visually organize information. The mind map is typically created around a single concept, which is drawn as an image in the center of the diagram. Associated representations of ideas such as images, words and parts of words are added to each of the branches stemming from the single concept. In the representation described herein, a comprehensive listing of functions and sub functions are detailed in all of the branches stemming from the single concept. Typically, the function-flow model for the apparatus is generated by a subject matter expert such as, but not limited to, a technical specialist, system engineer, application engineer, design engineer, manufacturing engineer, or other personnel who has in-depth knowledge of the subject matter and functionality of the apparatus.

In addition to enumerating all functionality associated with the identified apparatus through the function-flow model, failure modes associated with the identified functionality of the apparatus are also enumerated. This provides a comprehensive listing identified by a subject matter expert of the various functions and associated failure modes associated with the apparatus.

A plurality of heterogeneous data sources are used to obtain failure data are identified. The plurality of heterogeneous data sources may include, but are not limited to, voice of the customer data 12, voice of the process data 14, and voice of the business data 16. Voice of the customer data 12 may include Consumer Reports, in vehicle servicing systems (e.g., OnStar), technical assistance centers, customer assistance centers, and early quality feedback reports where customer feedback and complaints are collected and obtained. Voice of the process data 14 may include entities where the product is manufactured and assembled that have quality metric plant reporting systems data such as, but is not limited to, problem resolution tracking system (PRST), dynamic vehicle test (DVT), direct run rate (DRR), customer awareness and recognition (CAR), global customer audit (GCA). Voice of the business data 16 may include, but is not limited to warranty data and post warranty reporting data. In addition, other data source may include service center data 18, engineering standards 20, company internal specifications 22, (e.g., component technical specification (CTS) and subsystem technical specifications (SSTS)). Prior failure mode documentations 24 (e.g., FMEA) may be utilized.

A semantic similarity module 26 is applied between the information provided by each of the heterogeneous data sources described herein and the function-flow model 10. The semantic similarity module 26 bridges a variety of terms used in both the heterogeneous data and the function-flow model 10. It should be understood that a same failure may be described in different forms using different terminology. For example, a customer may state that "there is a radiator leak", whereas a technical specification may state "low levels of radiator fluid detected in the radiator." Therefore, the semantic similarity module 10 may bridge the terminology as well as the phrases utilized to state a same failure of a function. Typically, semantic similarity techniques only obtain data from a single source; however, the technique described herein is able to obtain data from a plurality of heterogeneous data sources by utilizing the function-flow model as described.

Moreover, a subject matter expert 26 may directly provide information based on past experiences and direct knowledge of the apparatus while working in the technological area. Such information may include personal knowledge 27 regarding the apparatus or threshold information 28 known by the subject matter expert.

The data as filtered and categorized utilizing the devices and techniques described herein is used to associate failures identified from the plurality of heterogeneous data sources to functions which can be incorporated into a new or existing failure modes documents 29 (e.g., FMEA, EFDM).

Figure 2:
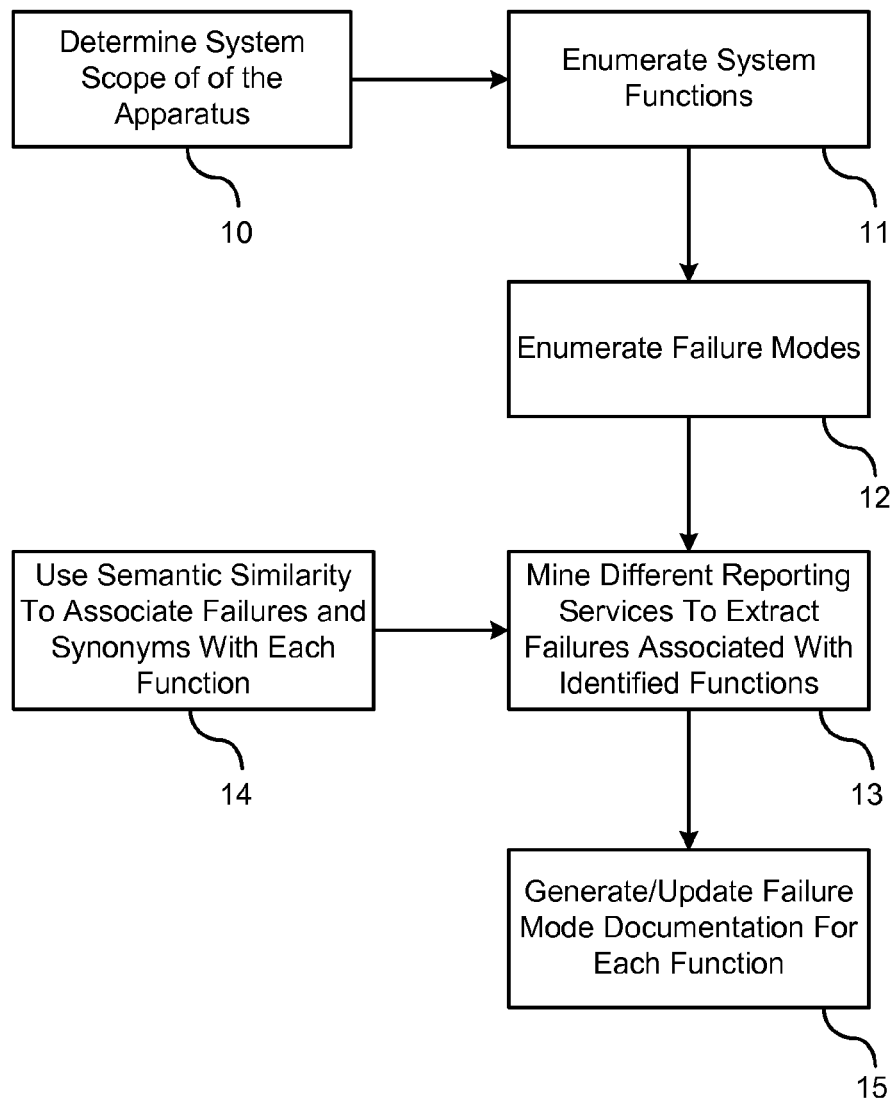
FIG. 2 is a flowchart of a method for generating failure mode documentation and autonomously developing an ontology from various heterogeneous data sources.

FIG. 2 illustrates a flowchart for generating failure mode documentation and autonomously developing an ontology from various heterogeneous data sources.

In block 30, a comprehensive scope of the apparatus is identified. This includes identifying all other apparatuses that interact both directly and indirectly with the identified apparatus. The comprehensive scope of the apparatus identifies the borders of the apparatus which assist in defining how function and failures can be categorized. In embodiments described herein, a functional-flow model may be generated for identifying the composite structure of the apparatus. This involves generating a normative model of how the system is believed to behave, as opposed to inferring a composite structure from data itself. The functional-flow model identifies the apparatus as the primary concept and all functionality stems from the primary concept.

In block 31, functions associated with the identified apparatus are enumerated. This includes identifying all functionality associated with the apparatus both directly, indirectly, statically, and dynamically. Functions are typically provided by sources that include, but are not limited to, design documentation, subject matter experts, technical specifications, and operation specifications. If an apparatus design is already in existence, then data relating to the functionality of the apparatus may be stored in a database, and a processor may retrieve the functional data from the database.

In block 32, failures associated with the functions identified in block 31 are enumerated based on the function-flow model. All occurrences relating to how the apparatus may fail are identified for comparison with external sources which will be described in detail in the following steps. Such failures may include a failed operation where the function does not operate as intended or operates in another manner.

In block 33, failure data is obtained from a plurality of heterogeneous data sources. Such sources include, but are not limited to, those data sources described in reference to FIG. 1. Typically, such data sources will include standard and non-standard language of reported failures. That is, standard language may be viewed as language that engineering or quality reporting would utilize. Nonstandard language would include, for example, language that the general population would use to describe a failure. In comparison, while two entities may describe the same failure, the terminology and how it is phrased may be entirely different. Therefore, the failures reported in each of the heterogeneous data sources in cooperation with the enumerated failures derived from the function-flow model must be compared to determine which failures from each of the sets of data are associated with the respective identified function and categorized accordingly.

In block 34, a semantic similarity module is applied by a processor to the enumerated failures by autonomously comparing the plurality of documents between heterogeneous data sources for bridging the plurality of terms used in each of the respective heterogeneous data sources to describe a respective failure and related to a respective function. The failures associated with the numerous apparatus functions are extracted from the plurality of documents between heterogeneous data sources for generating a composite of related synonyms for each identified failure mode. The processor uses the output from the semantic similarity module, which identifies associated failures from each of the documents, to be fused and are autonomously categorized to a respective bin according to the type of failure identified. Each classification bin is a comprehensive failure structure for an associated function. As a result, a variety of standard and non-standard data may be correlated and grouped so that failures from each of the respective documents may be properly classified and binned to the correct category.

In block 35, failure mode documentations for each function may be updated utilizing the failures binned to each categorized function. A failure mode documentation generation module may be used to autonomously generate the failure mode documentation. The failure mode document generation module includes a processor and data storage devices for retrieving the respective categorized data and for extracting and compiling the respective functions and associated failures in the document. An output device may be used to output failure modes documents in hardcopy or electronically.

Figure 3:
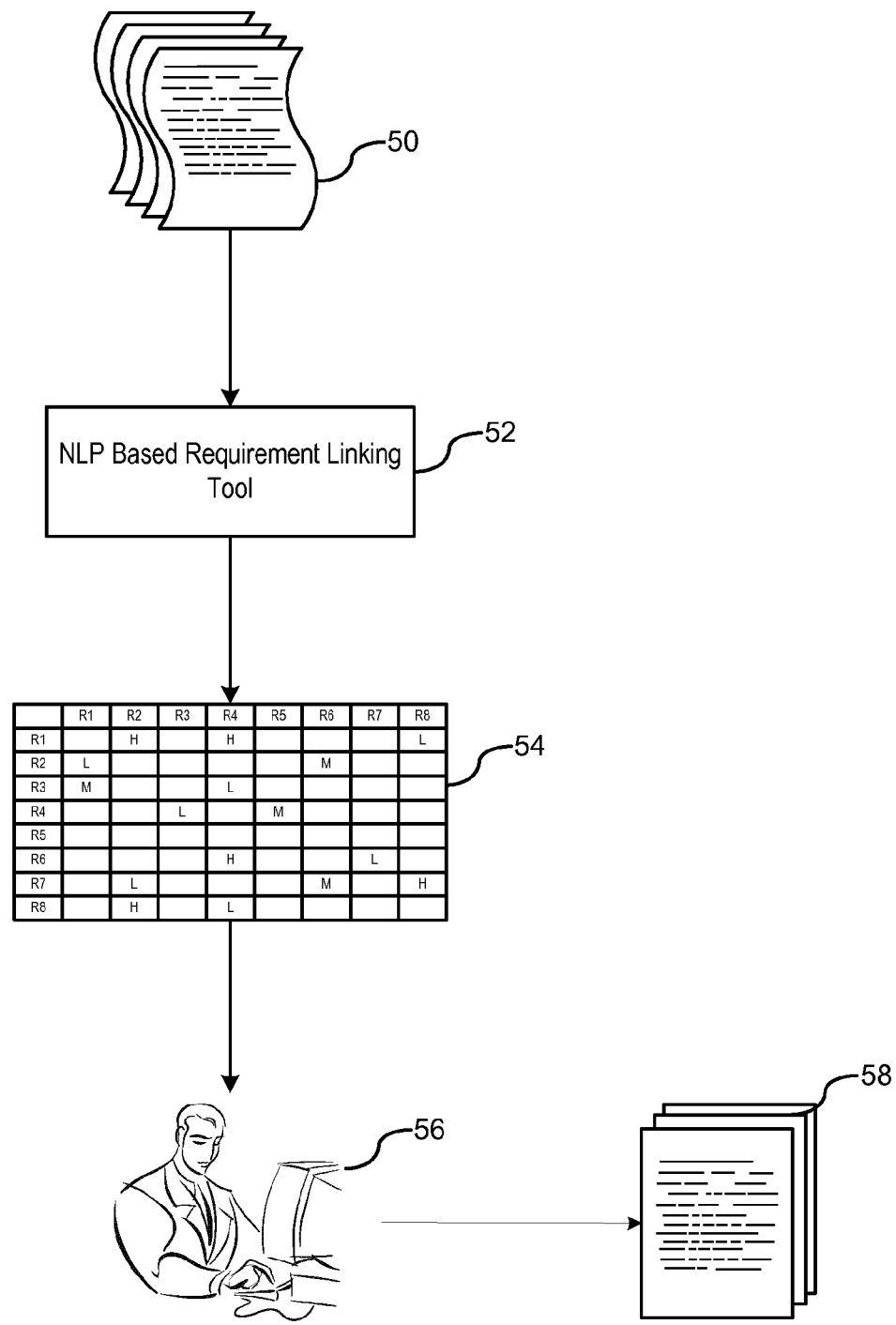
FIG. 3 is a block diagram of a general flow process for the requirement linking technique.

The following description provided details of the semantic similarity technique described. FIG. 3 illustrates a block diagram for analyzing implicit associations between requirements. A requirement is a description concerning a part or system or software that provides details as to the functionality and operation requirements of the part or system or software. In FIG. 3, requirement documents are shown generally at 40. Requirements are automatically correlated in a requirement matrix whereby requirements are linked by a natural linking processing-based requirement linking tool 52 for identifying a degree of linking relationships between one another. The relationships are illustrated in a requirement matrix 54. The requirement matrix 54 is provided to a peer review such as a domain expert 56. The domain expert 56 analyzes requirement matrix 54 and identifies in-consistency or correctness issues between the various documents/requirements and outputs those results in an analysis report 48, which effectively improves the quality of the requirements document.

Figure 4:
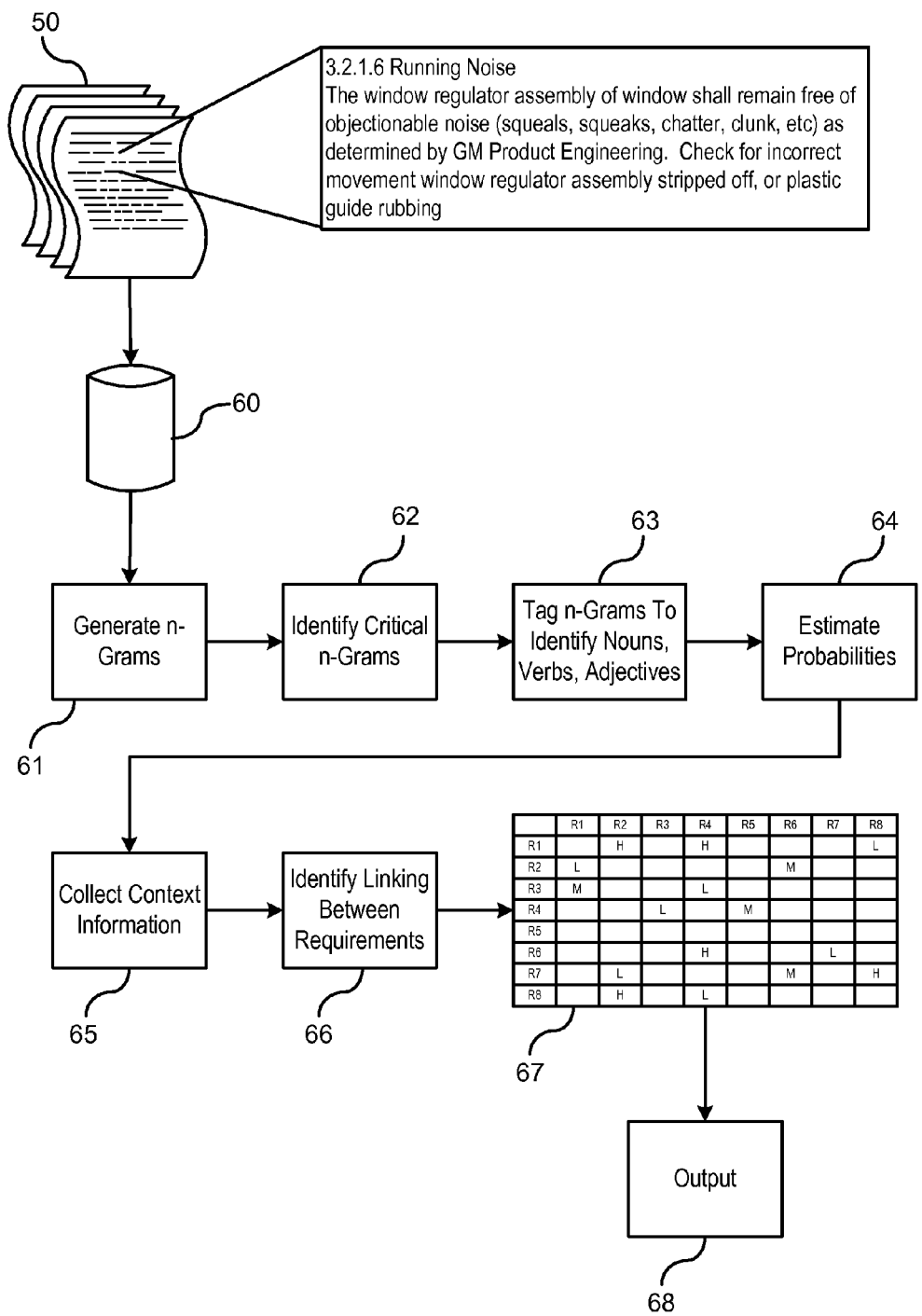
FIG. 4 is a block diagram of the overall methodology of the requirement linking technique.

FIG. 4 illustrates a flow diagram for the overall methodology of the requirement linking approach. The methodology includes a requirement documents 50 stored in a document database 60, a n-grams generation module 61, a critical n-grams identifier module 62, a tagging n-grams to identify part-of-speech (POS) tag module 63, an estimating probabilities module 64, a context information collection module 65, a linking relationship requirements module 66, a requirement matrix 67, and an output record generator module 68 that fills in the calculated link details from the linking requirements module 66 within the requirement matrix 67. It should be understood that each of the different modules herein may be a separate device, such a separate processor that cooperatively communicate via communication links with one another, or may one or more modules may be integrated in a respective processor having shared processing capabilities. Moreover, each of the modules may have a separate memory storage unit or may be memory storage unit that is shared.

Block 50 illustrates a plurality of requirements contained in the document database 60. An example of a requirement is shown that includes a description for running noise for a window regulator. The requirement identifies one or more components that have an associated description relating to, but not limited to, functionality, operation, and associated restrictions.

As shown in the exemplary requirement, the window regulator assembly should be free of certain affects such as objectionable noise. It is understood that the term "window regulator assembly" in addition to the term "objectionable noise" may be used in other requirements in the document. As a result, the requirement documents are analyzed for identifying linking relationships from other requirements/documents.

In block 61, terms are extracted by a natural language processing (NLP) technique for determining linking relationships to other requirements as set forth in the procedure herein. The extracted phase, hereinafter is referred to as an n-gram, is identified. The term "gram" refers to the term or terms of the phrase as a whole and "n" refers a number of terms associated with the phrase. For example, the term "window" would be identified as a uni-gram, whereas the term "window regulator assembly" would be identified as a tri-gram.

From each requirement document, the following types of n-grams are constructed: uni-grams that include phrases with a single word, (e.g. battery, transmission); bi-grams that include phrases with two words, (e.g. battery dead); tri-grams that include phrases with three words (e.g. body control module, instrument panel cluster, powertrain control module); four-grams that include phrases with four words (e.g. body control module inoperative, transmission control module assembly), and five-grams that includes phrases with five words (e.g. transmission control module assembly failed). The rationale of potentially utilizing possibly an n-gram that is five words long is due to a critical nature of a phrase in some instances containing five words. For example, critical terms that are the names of parts, symptoms, actions, and failure modes may be five words in length.

The n-grams are constructed and utilized because the technique described herein does not use any domain specific ontology (i.e., taxonomy) that would provide an origin or database of terms to identify critical terms from each requirement document. As a result, a natural language processing (NLP) approach is utilized whereby the n-grams constructed at this stage of the technique are subsequently tagged with their part-of-speech for identifying the correct classification of terms.

In block 62, critical n-grams are identified. It should be understood that not every single phrase that is in the requirement document is important for analysis. Therefore, non-critical terms must be filtered and only phrases that are relevant in the given context, such as those related to a specific Sub-System Management Team (SMT) while comparing two requirements should be maintained. For example, while comparing the requirements related to a body control module, phrases related only to the body control module are retained and all other phrases which are not directly contributing to the comparison are removed.

Figure 5:
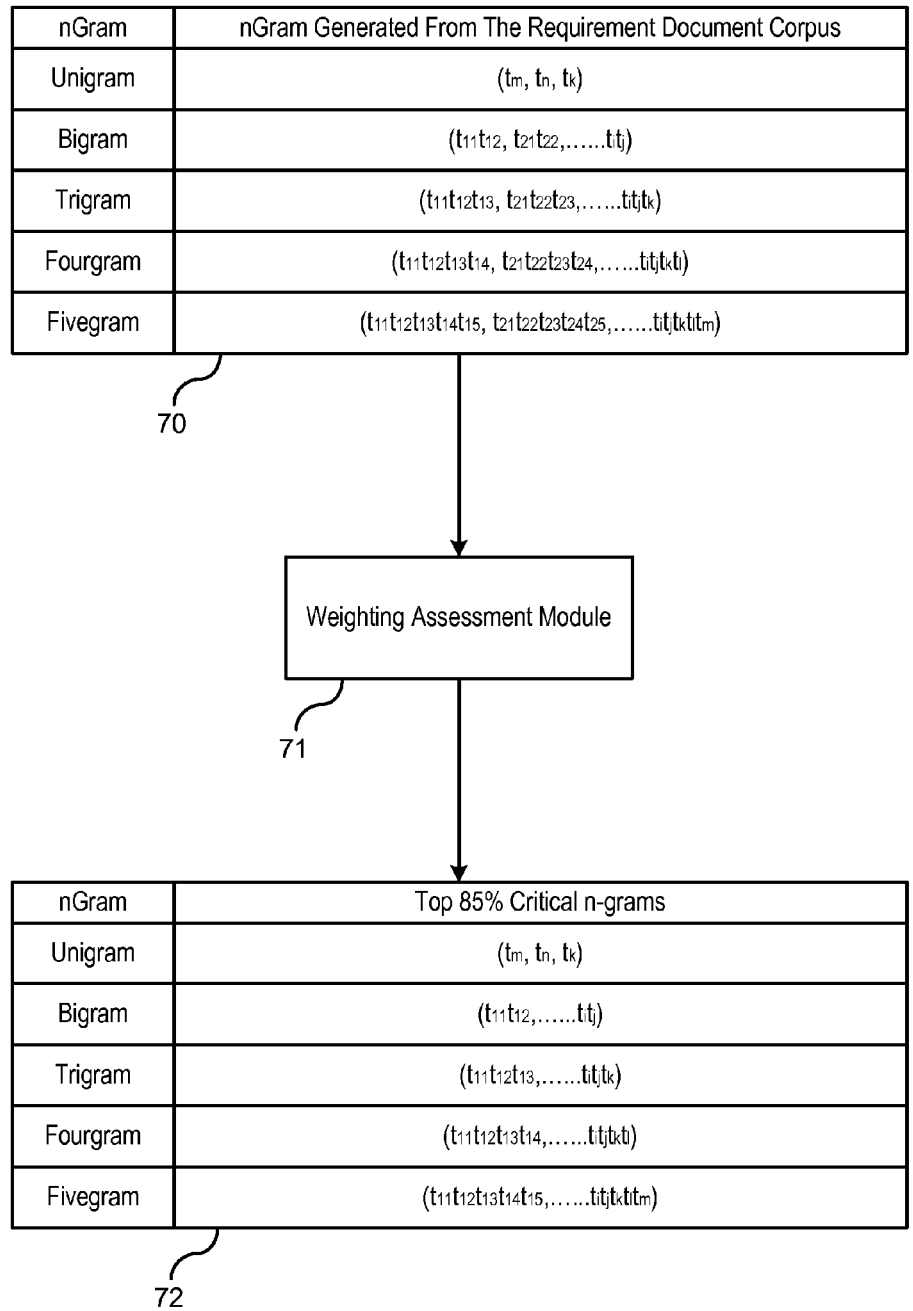
FIG. 5 is a flow diagram for identifying critical n-grams.

FIG. 5 illustrates a flow diagram for identifying critical n-grams from all of the n-grams identified in from the requirements document. Block 70 represents identified n-grams. The search is automatically conducted using NLP to identify all n-grams in the document.

In block 71, a weighting assignment module is applied to the identified n-grams.

In block 72, critical n-grams are identified using a filtering process applied by the weighting assignment module. N-grams meeting a predetermined criticality threshold are identified. An exemplary predetermined threshold of 85% or higher may be used.

The criticality of the n-grams $(C_{n-gram})_{i,j}$ is calculated by using the following equations:

$$(C_{n-gram})_{i,j} = C_{i,j} * idf_{C_i} \quad (1)$$

$$C_{i,j} = \frac{n_{i,j}}{\sum_k n_{k,j}} \quad (2)$$

where $n_{i,j}$ is the number of occurrences of a given n-gram in a given requirement document, $C_i$ is the appearance of ith n-gram in a requirement document $C_j$, and the denominator is the sum of number of occurrence of all n-grams in $C_j$ in a given requirement document.

The weighting factor $idf_{C_i}$ is calculated using the following formula:

$$idf_{C_i} = \frac{\log|V|}{|\{v : C_i \in v\}|} \quad (3)$$

where $|V|$ is a total number of requirement documents in a corpus, and $\{v: C_i \epsilon v\}$ is number of requirement documents only with the records of $C_i$.

Referring again to FIG. 4, block 63 represents enabling of POS tagging. Critical n-grams identified in step 62 are utilized as the input data. These critical n-grams are tagged with appropriate POS tags for identifying the critical parts, symptoms, actions, and failure modes, which are used in each requirement document. The critical n-grams are utilized as inputs and the POS algorithm outputs POS tags assigned to each n-gram. For example, the phrases such as "fuel pump", "evap vent valve", "engine light", reduced engine power", "will not start", "replace" are assigned the following POS tags: "fuel/NNP pump/NNP", evap/NNP vent/NNP valve/NNP", "engine/NN light/JJ", "reduced/VBN engine/NN power/NN", "will/MD not/RB start/NNP", "replace/VB".

Figure 6:
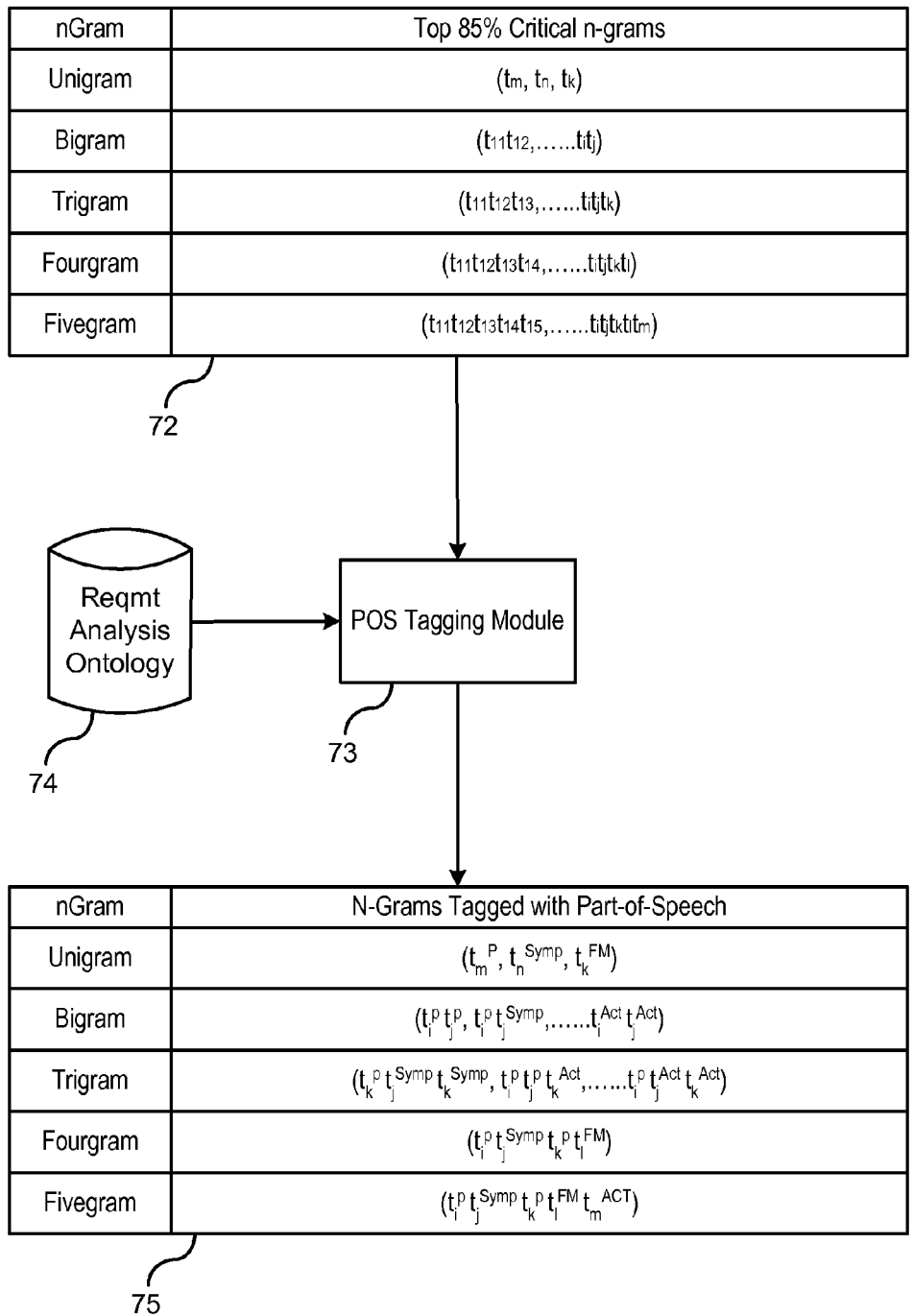
FIG. 6 is an exemplary POS tagging process utilizing the critical N-grams.

FIG. 6 illustrates an exemplary POS tagging utilizing the critical N-grams. The N-grams are set forth in the table identified in block 72.

A POS tagging module 73 is used to apply tags to the critical N-grams. Tags may be in the form including, but not limited to, CC (coordinating conjunction), CD (cardinal number), JJ (adjective), JJR (adjective comparative), NN (noun, singular or mass), NNS (noun plural), NNP (proper noun singular), NNPS (proper noun plural), RB (adverb), RBR (adverb comparative), RBS (adverb superlative), VB (verb, base form), VBD (verb past tense), VBD (verb, present participle), VBN (verb, past participle), VBP (verb, non-$3^{rd}$ person singular present), VBZ (verb, $3^{rd}$ person singular present). Optionally, a requirements analysis ontology 74 may be used to assist in the tagging a term of a phrase as a one of the part-of-speech tags.

Table 75 illustrates the critical terms with assigned POS tags. As shown, terms in the table are assigned an identifier that identifies its part of speech. It should be understood that the POS tags herein are exemplary and that different POS identifiers such as the exemplary tags described earlier may be used.

Referring again to FIG. 4, in block 64, in response to the assigning POS tags to the critical terms, a maximum likelihood of a specific n-gram having an assigned POS tag in the data is determined [$P(pos\text{-}tag_i | n\text{-}gram_i)$]. This assists in identifying whether the tag assigned to an n-gram is one of chance or whether it has a higher probability of having specific type of POS tag in a domain. A maximum likelihood estimation is performed by using the following steps:

In the first stage, while estimating a probability, Bayes law is used as shown in the following equation:

$$\arg_{post\text{-}tag_i}\max P(\text{pos-}tag_i | n\text{-}gram_i) = \qquad (4)$$
$$\arg_{post\text{-}tag_i}\max \frac{P(n\text{-}gram_i | \text{pos-}tag_i)P(\text{pos-}tag_i)}{P(n\text{-}gram_i)} =$$
$$\arg_{post\text{-}tag_i}\max P(n\text{-}gram_i | \text{pos-}tag_i)P(\text{pos-}tag_i)$$

The denominator $P(n\text{-}gram_i)$ is going to be constant for each new instance of POS-$tag_i$; otherwise, it is not considered in the following stage.

In stage 2, in response to analyzing the higher-dimension n-grams (e.g., bi-gram to five-gram), a Bayes independence assumption is applied so that terms that are members of these n-grams are independent of one another. As shown below, the application of independence assumption on the exemplary bi-gram can be extended straightforwardly to other n-grams.

$$P(\text{pos-}tag_i) \approx P(\text{pos-}tag_i | \text{pos-}tag_{i-1}) \qquad (5)$$

$$P(\text{pos-}tag_{i-1} | \text{pos-}tag_{i-2}) \ldots P(\text{pos-}tag_2 | \text{pos-}tag_i) =$$
$$\prod_{m=1}^{i} P(\text{pos-}tag_m | \text{pos-}tag_{m-1}).$$

The term's identity depends on the tag assigned to it which yields the following equation:

$$P(n\text{-}gram_i | \text{pos-}tag_i) \approx \prod_{m=1}^{i} P(n\text{-}gram_m | \text{pos-}tag_m) \qquad (6)$$

$$\hat{p}\text{os-}tag_1 = P(n\text{-}gram_m | \text{pos-}tag_m)P(\text{pos-}tag_m | \text{pos-}tag_{m-1})$$

Finally, the probabilities given in Eq. (6) are calculated by using the maximum likelihood estimations as shown in the following equation:

$$P(\text{pos-}tag_m | \text{pos-}tag_{m-1}) = \frac{f(\text{pos-}tag_{m-1}, \text{pos-}tag_m)}{f(\text{pos-}tag_{m-1})} \qquad (7)$$

$$P(n\text{-}gram_m | \text{pos-}tag_m) = \frac{f(n\text{-}gram_m, \text{pos-}tag_m)}{f(\text{pos-}tag_m)}$$

Using Eq. (7), the probability of specific POS-tag (i.e. pos-$tag_m$) having a specific n-$gram_m$ is estimated.

Figure 7:
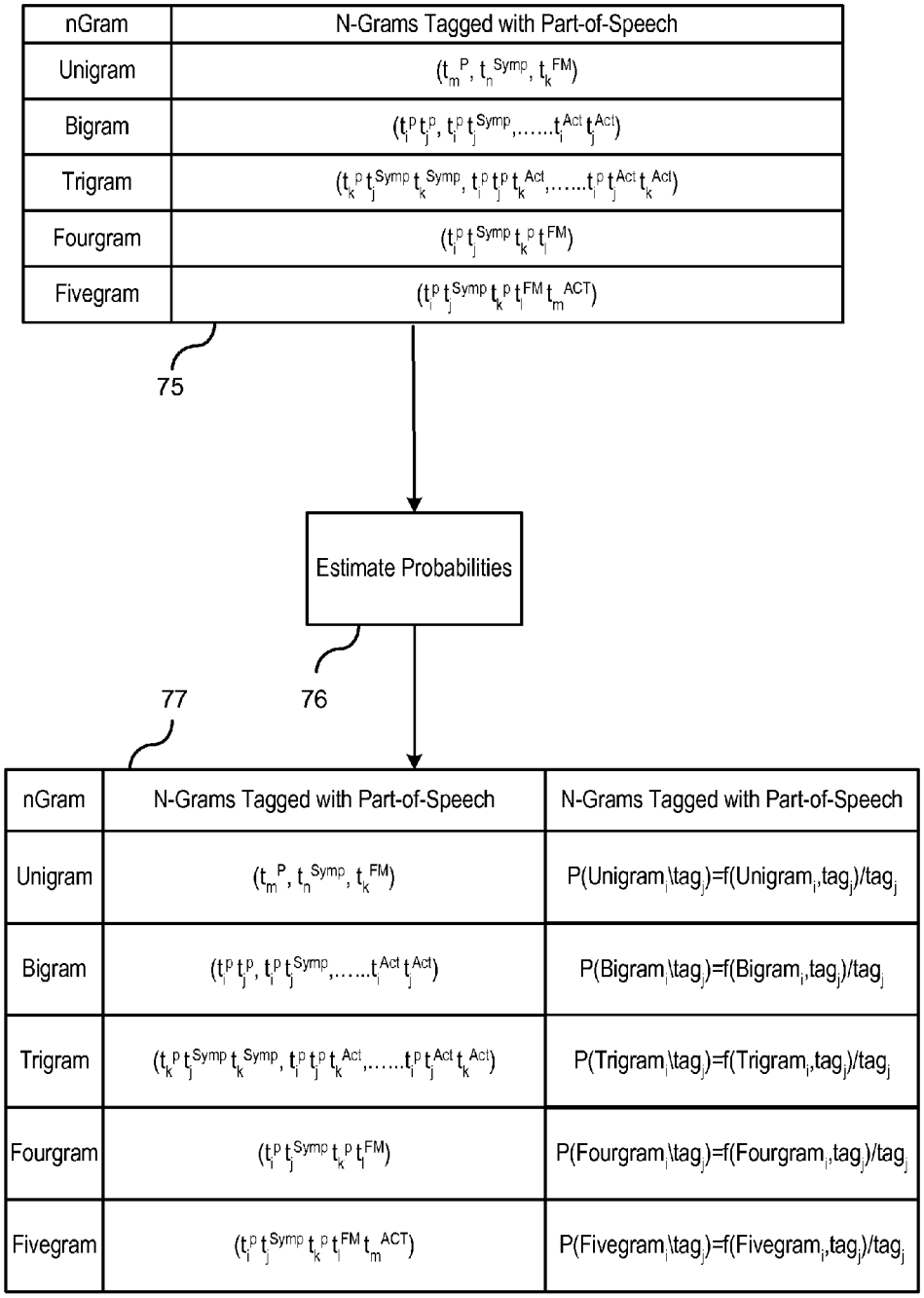
FIG. 7 is a flowchart for an exemplary probability estimation for POS tagging.

FIG. 7 illustrates an exemplary probability estimation for POS tagging. The N-grams are set forth in the table identified in block 75.

An estimation probabilities module 76 is used to determine the probability of a specific POS-tag having specific n-grams is estimated utilizing the process described above.

Table 77 illustrates an exemplary table identifying n-grams tagged with the POS and the associated probability as generally denoted.

Referring again to FIG. 4, in block 65, context information is collected. After assigning POS tags to critical n-grams in the previous two steps, contextual information is collected from each requirement document. The contextual information is critical as this information enables the comparison of terms in the correct context using semantic similarity. For example: it is assumed that the term "Switch" may be used in three different contexts: 1. Window Switch, 2. Light Switch and 3. Radio Switch. The term radio switch cannot be compared and linked with light switches or window switches. To properly compare and apply linking relationships, context information is required.

The contextual information collected for each POS tagged n-gram from any requirement documents is subsequently used to calculate the semantic similarity between them. For each requirement document, starting from the beginning of a respective document, a critical phase that is assigned with a POS tag is identified. Next, a start index and an end index of an identified focal term are identified. As shown below, a word window of three words is set on the either side of a focal term. The word window is a variable which shall be decided based on the nature of the document.

XXXX$T_1$XX[$T_2$xx$^{StartIndex}$ {Phrase$_i$}$^{EndIndex}T_3 X T_4$]XXX
Context information on left=(Phase$_i$, $T_2$)
Context information on right=((Phrase$_i$, $T_3$), (Phrase$_i$, $T_4$))

The terms co-occurring with a focal term in the word window are collected as the context information. For example, Context$_{Phrasei}$=(term$_1$, terms$_2$, . . . , term$_m$ and Context$_{Phrasei}$=(term$_1$, terms$_2$, . . . , term$_n$). After context information is collected for the first critical phrase in a document, the same process is repeated by identifying remaining critical phrases for the remainder of the document.

In response to collecting the contextual information co-occurring with focal terms from different requirement documents, a probability is calculated for seeing the contextual information co-occurring with the focal terms together in the complete corpus [P(Context Information$_j$|Focal Term$_i$)]. The formula for determining the probability is as follows:

$$P(\text{Context\_Info}_j|\text{FocalTerm}_i)=P(\text{Context\_Info}_j \cap \text{FocalTerm}_i)/P(\text{FocalTerm}_i) \quad (8)$$

Taking into account P(Context_Info$_j$|FocalTerm$_i$), low probability instances of the terms co-occurring with the critical terms are deleted, which results in the following two context matrices associated with any two requirement documents (e.g., R$_i$ and R$_j$):

$$CM_{Ri}=((T_m,Part_i)(T_m,\text{Symptom}_j),(T_m,\text{Action}_k))$$

$$CM_{Rj}=((T_n,Part_i),(T_n,\text{Symptom}_n),(T_n,\text{Action}_n))$$

Figure 8:
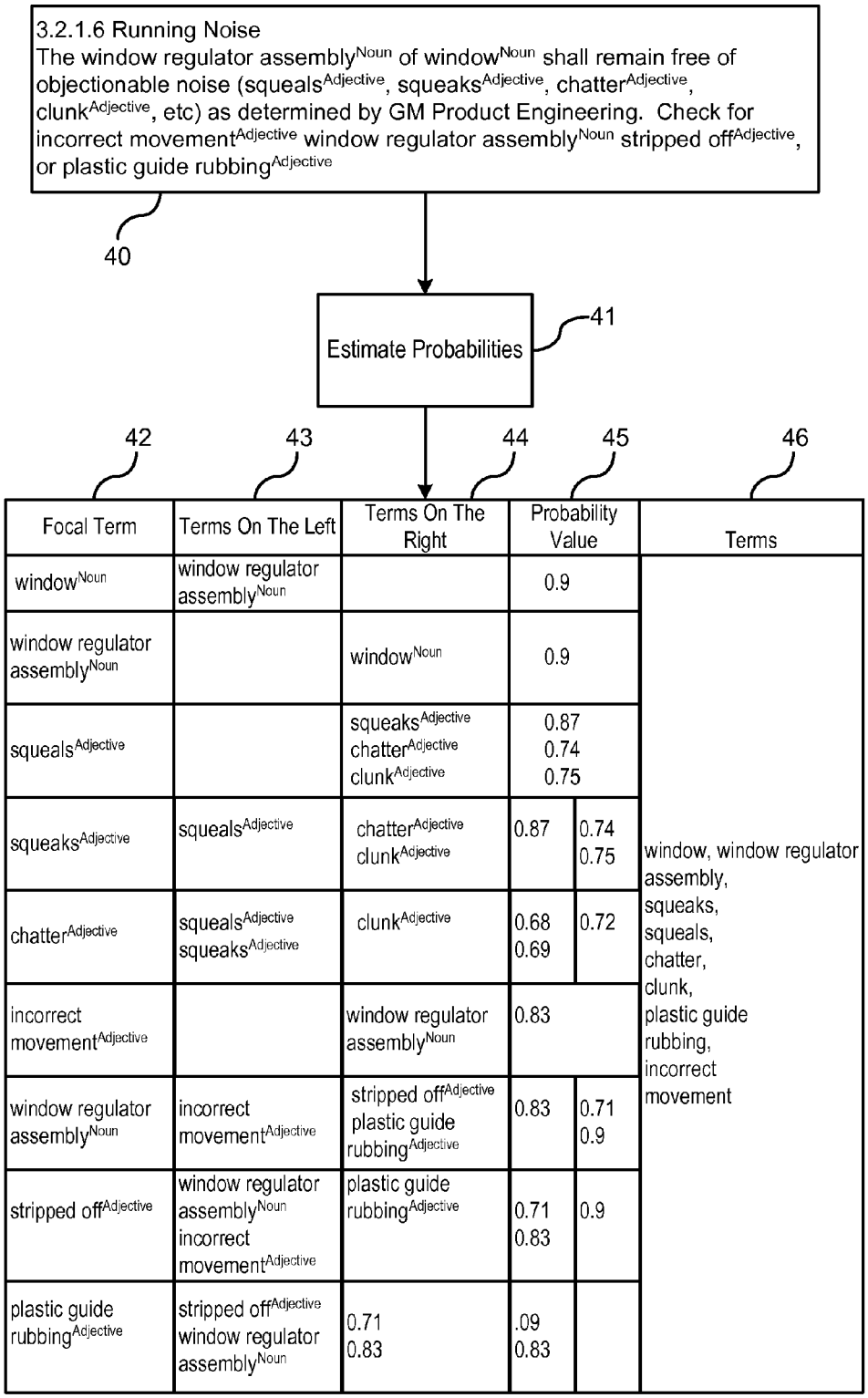
FIG. 8 is a flowchart for associating probabilities with contextual information.

FIG. 8 illustrates a process flow for associating probabilities with contextual information. In block 80, an exemplary requirement is shown with POS tags.

In block 81 probabilities of terms co-occurring with critical terms are identified and set forth in the table identified in table as shown. As shown in the table, a first column 82 represents a focal term. The second column 83 represents identified terms to the left of the focal term. The third column 84 represents identified terms to the right of the focal term. The fourth column 85 represents an identified probability value for each term in relation to the focal terms. The fifth column 86 represents all of the terms identified in the requirement that are being analyzed. Terms having a low probability for co-occurring with critical terms are deleted.

Referring again to FIG. 4, in block 66, a semantic similarity is computed between any two requirement documents (e.g., R$_i$ and R$_j$) by using the context matrices constructed in the previous step. Terms associated with two respective context matrices are used to compute a first term-to-term semantic similarity score such as:
  sim (Term$_i$,Term$_j$)
  where (Part$_i$, Symptom$_j$,Action$_k$)$_{CMR_i}$ $\in$ Term$_i$,
  and (Part$_i$,Symptom$_m$,Action$_{nk}$)$_{CMR_j}$ $\in$ Term$_j$
The sim(Term$_i$, Term$_j$) is represented by the following equation:

$$\text{sim}(\text{Term}_i, \text{Term}_j) = \log_2\left\{1 + \frac{\text{hits}(\text{Term}_i, \text{Term}_j)^2}{\text{hits}(\text{Term}_i) \cdot \text{hits}(\text{Term}_j)}\right\} \quad (9)$$

where, hits(Term$_i$) and hits(Term$_j$) as well as hits(Term$_i$, Term$_j$) represents the number of times (Term$_i$) and (Term$_j$) as well as the binary Tuple(Term$_i$,Term$_j$) appear in the corpus.

This score is subsequently used to compute a tuple-to-tuple semantic similarity score:
  sim(Tuple$_i$,Tuple$_j$)
  where CMR$_{Ri}$, $\in$ Tuple$_i$, and
  CMR$_{Rj}$, $\in$ Tuple$_j$.
The sim(Tuple$_i$,Tuple$_j$) is represented by the following equation:

$$\text{sim}(\text{Tuple}_i, \text{Tuple}_j) = \log_2\left\{1 + \frac{\text{hits}(\text{Tuple}_i \ \& \ \text{Tuple}_j)^2}{\text{hits}(\text{Tuple}_i) \cdot \text{hits}(\text{Tuple}_j)}\right\} \quad (10)$$

where, hits(Tuple$_i$) and hits(Tuple$_j$) represents the frequency of occurrence of the tuples in the corpus, whereas the hits (Tuple$_i$,Tuple$_j$) represents the number of times (Tuple$_i$) and (Tuple$_j$) appear in the documents of the corpus.

Eq. (10) is achieved by extending a standard PMI-IR definition and making two changes: (1) the square term in the numerator and; (2) addition of one to the fraction. Both changes are motivated to scale the PMI measure between zero (tuples never co-occurring) and one (identical tuples or tuples always occurring together).

By combining term-to-term and tuple-to-tuple semantic similarity scores computed in Eq. (9) and (10) respectively the text-to-text semantic similarity score is derived using the formula as follows:

$$\text{sim}(R_i, R_j) = \frac{1}{2}\left\{\left(\frac{\sum_{Tuple_i \in R_i}(\text{maxsim}(\text{Tuple}_i, R_j).idf(\text{Tuple}_i))}{\sum_{Tuple_i \in R_i} idf(\text{Tuple}_i)}\right) + \left(\frac{\sum_{Tuple_j \in R_j}(\text{maxsim}(\text{Tuple}_j, R_i).idf(\text{Tuple}_j))}{\sum_{Tuple_j \in R_j} idf(\text{Tuple}_j)}\right)\right\} \quad (10)$$

The max Sim(Tuple$_i$,R$_j$) is calculated by using the following formula:

$$\text{maxsim}(\text{Tuple}_i,R_j)=\max_j\{\text{sim}(\text{Tuple}_i,\text{tuple}_j)\};\text{tuple}_j \in R_j \quad (11)$$

Given the calculated semantic similarity, the algorithm classifies the requirement linking into the following three categories: The first category, if the semantic similarity value between R$_i$ and R$_j$ is above 0.87 then R$_i$ and R$_j$ is classified as having high likelihood of linking. The second category, if the semantic similarity value between R$_i$ and R$_j$ is greater than 0.63 but less than 0.87 then R$_i$ and R$_j$ are classified as having medium likelihood of linking. The third category, if the semantic similarity value between R$_i$ and R$_j$ is less than 0.63 then R$_i$ and R$_j$ are classified as having low likelihood of linking. It should be understood that the above ranges are only one grouping of recommended ranges, and ranges in addition to the ranges described herein may be utilized without deviating from the scope of the invention.

Given the likelihood determinations from each respective set of requirements documents, a matrix is generated as illustrated block 67. The matrix matches each requirement against one another and identifies whether a linking relationship exists and the strength of the linking relationship.

In block 68, the output record generator outputs an analysis report which is provided to a domain or subject matter expert to review. The output record generator may output an electronic report or a hardcopy report for use by the subject matter expert. Utilizing the identified linking relationships, the subject matter expert reviews and modifies the requirements accordingly.

It should be understood that analysis report not only identifies linking relationships to improve the textual requirements, but the analysis report assists test engineers by indicating how the new requirements are connected to old requirements. As a result, tester engineers can include specific test cases to a test plan to identify any potential error. This not only improves the test, but the product quality and warranty. In addition, the analysis report may be a precursor to identifying warranty issues since the warranty takes a predetermined amount of time (e.g., 6 months) before data is collected when a new model is produced.

While certain embodiments of the present invention have been described in detail, those familiar with the art to which this invention relates will recognize various alternative designs and embodiments for practicing the invention as defined by the following claims.

What is claimed is:

1. A method of automatically developing an ontology for product function and failure mode documentation for an apparatus, the method comprising the steps of:
   identifying the apparatus;
   generating a function-flow model for the identified apparatus for identifying a composite structure of the apparatus;
   enumerating functions associated with the identified apparatus;
   enumerating failure modes for the enumerated apparatus functions;
   obtaining failure data from a plurality of heterogeneous data sources;
   applying a semantic similarity module to the enumerated failures by comparing a plurality of documents between heterogeneous data sources, the semantic similarity module bridging a variety of terms used in the heterogeneous data to describe a respective failure;
   extracting failures associated with the enumerated apparatus functions from the plurality of documents between heterogeneous data sources;
   generating a composite of related terminology for each identified failure mode; and
   generating a failure mode information document utilizing the composite of related terminology for each identified failure mode.

2. The method of claim 1 wherein the function-flow model identifies a functional composition relating to classification bins.

3. The method of claim 2 wherein each classification bin is a comprehensive failure structure for an associated function.

4. The method of claim 1 wherein the function-flow model identifies boundaries on how the identified apparatus should function.

5. The method of claim 4 wherein the function-flow model identifies primary functions of the identified apparatus.

6. The method of claim 4 wherein the function-flow model identifies indirect functions of the identified apparatus.

7. The method of claim 4 wherein the function-flow model identifies interactions with components interacting with the apparatus.

8. The method of claim 4 wherein the function-flow model identifies failure conditions of the identified apparatus.

9. The method of claim 1 wherein enumerating functions associated with the identified apparatus include identifying all functionality associated with the identified apparatus.

10. The method of claim 1 wherein enumerating failure modes for the enumerated apparatus functions includes identifying how the identified apparatus fails.

11. The method of claim 1 wherein obtaining failure data from the plurality of heterogeneous data sources includes obtaining standard and non-standard language of reported failures.

12. The method of claim 1 wherein obtaining failure data from the plurality of heterogeneous data sources includes a plurality of failure reporting entities.

13. The method of claim 1 wherein the plurality of failure reporting entities include customer entities that collect customer complaints.

14. The method of claim 1 wherein the plurality of failure reporting entities include customer entities that assemble the identified apparatus.

15. The method of claim 1 wherein generating a composite of related terminology for each identified failure mode includes fusing heterogeneous data from plurality of sources and classifying the failure according to a type of failure.

16. The method of claim 1 wherein generating a failure mode document includes generating a design failure effects and analysis document.

17. The method of claim 1 wherein generating a failure mode document includes generating a function-failure design method document.

18. The method of claim 1 wherein the semantic similarity module provides a degree of linking relationships between data of the heterogeneous data sources.

19. The method of claim 18 wherein the semantics similarity module conjugates verbs between the data of the heterogeneous data sources.

20. The method of claim 18 wherein the semantics similarity module enumerates synonyms between the data of the heterogeneous data sources.

21. The method of claim 18 wherein the semantics similarity module identifies misspellings for identifying related terms.

22. The method of claim 1 wherein the semantics similarity module assigns a part-of-speech tag to a respective term for determining whether the term is a part, symptom, action, or failure mode term.

23. The method of claim 1 wherein the semantics similarity module identifies a term as a focal term, the semantics similarity module determining co-occurring terms within a predetermined distance of the selected focal terms, and where contextual information is collected enabling comparison of terms in similar context.

24. The method of claim 1 wherein the semantics similarity module identifies terms as critical phrases and non-critical phrases, and wherein the semantics similarity module disregards the non-critical phrases.

* * * * *